United States Patent
Stephens et al.

(10) Patent No.: US 9,695,814 B2
(45) Date of Patent: Jul. 4, 2017

(54) EVACUATING A CHAMBER

(75) Inventors: Philip John Stephens, Worthing (GB); Michael Geoffrey Thompson, Brighton (GB)

(73) Assignee: Edwards Limited, West Sussex (GB)

(*) Notice: Subject to any disclaimer, the term of this patent is extended or adjusted under 35 U.S.C. 154(b) by 352 days.

(21) Appl. No.: 14/124,111

(22) PCT Filed: May 31, 2012

(86) PCT No.: PCT/GB2012/051224
§ 371 (c)(1),
(2), (4) Date: Dec. 5, 2013

(87) PCT Pub. No.: WO2012/172307
PCT Pub. Date: Dec. 20, 2012

(65) Prior Publication Data
US 2014/0127038 A1 May 8, 2014

(30) Foreign Application Priority Data
Jun. 16, 2011 (GB) .................................. 1110196.1

(51) Int. Cl.
*F04B 49/20* (2006.01)
*F04B 49/06* (2006.01)
(Continued)

(52) U.S. Cl.
CPC .............. *F04B 49/20* (2013.01); *F04B 49/06* (2013.01); *F04D 19/042* (2013.01);
(Continued)

(58) Field of Classification Search
CPC ........ F04B 49/06; F04B 49/20; F04D 19/042; F04D 27/0261; Y10T 137/86083; Y10T 137/86139
See application file for complete search history.

(56) References Cited

U.S. PATENT DOCUMENTS 6,474,949 B1    11/2002 Arai et al.
2005/0031468 A1  2/2005 Kawaguchi et al.
(Continued)

FOREIGN PATENT DOCUMENTS

CN    1925110 A     3/2007
EP    1486673 A1   12/2004
(Continued)

OTHER PUBLICATIONS

International Search Report dated Sep. 19, 2012 for corresponding Application No. PCT/GB2012/051224, filed May 31, 2012.
(Continued)

*Primary Examiner* — Dominick L Plakkoottam
(74) *Attorney, Agent, or Firm* — Theodore M. Magee; Westman, Champlin & Koehler, P.A.

(57) ABSTRACT

A method and apparatus for reducing undesirable noise generated by a vacuum pumping system. The vacuum system operates to reduce the pressure in a chamber to a first pressure value. The system then detects that the pressure at the vacuum pump system's inlet is about to change to a second higher pressure and, in response, the speed of a booster pump in the vacuum pump system is reduced below the rated speed for the pump. When the pressure at the vacuum pump's inlet is above the second pressure, the speed of the booster pump is increased to the rated speed. Thus, the booster pump is slowed down prior the pump system becoming exposed to a rapid increase in inlet pressure.

6 Claims, 3 Drawing Sheets

(51) Int. Cl.
*F04D 19/04* (2006.01)
*F04D 27/02* (2006.01)

(52) U.S. Cl.
CPC ... *F04D 27/0261* (2013.01); *Y10T 137/86083* (2015.04); *Y10T 137/86139* (2015.04)

(56) References Cited

U.S. PATENT DOCUMENTS

| | | | |
|---|---|---|---|
| 2005/0196254 A1* | 9/2005 | Kim | H01L 21/67017 414/217 |
| 2007/0048145 A1* | 3/2007 | Ishii | F04D 27/0261 417/44.2 |
| 2011/0200450 A1 | 8/2011 | Shelley et al. | |

FOREIGN PATENT DOCUMENTS

| | | |
|---|---|---|
| EP | 2053249 A2 | 4/2009 |
| EP | 2290243 A2 | 3/2011 |
| JP | 3108228 U | 4/2005 |
| WO | 03078838 A1 | 9/2003 |
| WO | 2006100428 A1 | 9/2006 |

OTHER PUBLICATIONS

International Written Opinion dated Sep. 19, 2012 for corresponding Application No. PCT/GB2012/051224, filed May 31, 2012.
UK Search Report dated Oct. 13, 2011 for corresponding Application No. GB1110196.1, filed Jun. 16, 2011.
First Office Action and Search Report dated Jul. 28, 2015 for corresponding Chinese Application No. CN201280029528.0.

* cited by examiner

EVACUATING A CHAMBER

CROSS-REFERENCE TO RELATED APPLICATION

This Application is a Section 371 National Stage Application of International Application No. PCT/GB2012/051224, filed May 31, 2012, which is incorporated by reference in its entirety and published as WO 2012/172307 A1 on Dec. 20, 2012 and which claims priority to British Application No. 1110196.1, filed Jun. 16, 2011.

BACKGROUND

The present disclosure relates to a method and apparatus for evacuating a chamber using a vacuum pump and booster.

Vacuum pumps are used or needed in many industrial applications, such as power generation, steel manufacturing, and in the semiconductor, solar and flat panel display (FPD) industries, for instance. It is to be noted that the present invention is not limited to any one of these industrial applications. However, for convenience, the present invention is described below with reference to the semiconductor, solar, LED (light emitting diode) and FPD manufacturing industries (collectively referred to as semiconductor manufacturing). Of course, the skilled person understands that other industrial processes or applications can equally benefit from using the present invention.

Vacuum pumps are generally designed to run at an optimal speed during normal use. A vacuum pump's efficiency can be improved by using the pump in conjunction with a booster pump. With reference to FIG. 1 (in which a known semiconductor processing unit 1 is shown), the booster pump 28 is disposed between the vacuum pump 30 and a chamber being evacuated by the vacuum pump, which together makes up a vacuum pumping system. The booster is arranged to increase the flow rate of gas from the chamber. Typically, the booster is configured as a single stage roots blower and it does not significantly compress the gas. The booster/dry vacuum pump combination can remove relatively large volumes of gas from the chamber to evacuate it to pressure levels in the medium vacuum range.

In semiconductor manufacturing, substrates are processed in a process chamber 2 which is held at vacuum to enable deposition of material onto the substrate to occur. On a given tool, there might be a number of processing chambers accessible from a transfer chamber 4, also held at vacuum. Depending on the process, the substrates typically comprise a silicon wafer or a glass panel. It is common to use an airlock or loadlock chamber 10 to isolate the process chambers and transfer chamber from atmospheric pressure and to enable substrates to be moved to and from the process chamber without significant loss of vacuum pressure within the process chamber or transfer chamber. In this way, efficient movement of wafers or glass substrates into the main processing chamber of a production tool is enabled.

Typically the loadlock chamber has two sealed doors—a first door 12 is used to isolate the loadlock from a room at atmospheric pressure and a second door 14 is used to isolate the production tool from the loadlock. During normal use, it is not possible to open both the first and second doors at the same time. Opening the first door enables a batch of substrates to be placed in the loadlock. At this point the loadlock chamber is at atmospheric pressure and is isolated from the process chamber. The first door is then closed to isolate the loadlock chamber from the room and the process chamber. A vacuum pumping system 20 is used to evacuate the loadlock chamber before the second door is opened and the wafer is passed through to the processing chamber. Thus, the processing chamber and process tool are kept at vacuum pressures during the loading and extraction of substrates to or from the tool. Another tool architecture could be 'inline', where substrates enter the system through an entry load lock, then move into a connected process chamber, and once the process has completed, continue into an exit load lock at the other end of the machine.

The time taken to evacuate a loadlock chamber can be limiting factor on the amount of substrates being processed by a tool in any given time period. In addition, there is a trend to increase the size of substrates being processed in the processing tool, which is leading to an increase in volume of the associated loadlock chamber. This is particularly the case in solar panel manufacturing (which now requires large area solar panels to be processed onto large glass substrates) and silicon chip processing where wafer size is increasing from 300 mm to 450 mm. It is desirable, therefore, to increase the evacuation rate of loadlock chambers.

The loadlock chamber typically has a dedicated evacuation system 20 comprising one or more vacuum pumps. The process chamber typically uses a different evacuation system 21. This is desirable because of the harsh or corrosive nature of the chemicals used in processing devices within the chamber and the deleterious effect such chemicals have on the pumps evacuating the processing tool. In other words, the loadlock pumps typically do not need to be resistant to harsh chemical or corrosive environments.

The flow of gas from the loadlock chamber 10 to its vacuum pumping system 20 is controlled by a valve 24. When the valve is closed the vacuum pump evacuates any connecting pipes 25 between the loadlock chamber and the pump up to the point of the valve. When the valve opens, the vacuum pump is exposed to a rapid increase of pressure at the pumping system's inlet. This sudden increase in pressure can be many orders of magnitude and can occur within a few micro seconds of the valve opening. As a result, the vacuum pumping system experiences a rapid increase in gas load which can cause deceleration of the booster pump's moving parts thereby causing high noise levels as the pumps compresses relatively high pressure gas at a fast rate. In an evacuation system fitted with a mechanical booster pump 28, such as a roots blower, the sudden increase in inlet pressure causes the booster pump to decelerate very rapidly and generate extremely high noise levels.

The discussion above is merely provided for general background information and is not intended to be used as an aid in determining the scope of the claimed subject matter. The claimed subject matter is not limited to implementations that solve any or all disadvantages noted in the background.

SUMMARY

Embodiments aim to solve or ameliorate the noise generation problems associated with the processes and/or vacuum pumping systems described above. In essence, the embodiments provide a method and apparatus where the booster pump is slowed down prior to pump system becoming exposed to a rapid increase in inlet pressure. This has been found to reduce noise levels generated by the booster pump to a more acceptable level.

More particularly, according to several embodiments there is provided a method of reducing noise generated by a vacuum pump system operating to evacuate a chamber, the method comprising the steps of: A method of reducing noise generated by a vacuum pumping system operating to evacuate a chamber, the method comprising the steps of: operating the vacuum pumping system at a rated speed to reduce chamber pressure to a first pressure; determining that the pressure at the vacuum pumping system's inlet is about to change to a second pressure that is higher than the first pressure; in response to the determining step, reducing the speed of a booster pump in the vacuum pumping system to a second speed that is below the rated speed; and then increasing the speed of the booster pump to the rated speed when the pressure at the vacuum pumping system's inlet is above the second pressure.

Further still, according to some embodiments there is provided a method of reducing noise generated by a vacuum pumping system operating to evacuate a loadlock chamber connected to a semiconductor processing tool, the method comprising the steps of: operating the vacuum pumping system at a rated speed to maintain loadlock chamber pressure at a first vacuum pressure; activating a valve to isolate the loadlock chamber from the vacuum pumping system; determining that the pressure in the loadlock chamber has increased to a second pressure that is greater than the first pressure; reducing the speed of a booster pump in the vacuum pumping system to a second speed that is below the rated speed of the booster pump; and increasing the speed of the booster pump to the rated speed after the loadlock chamber and vacuum pump are reconnected.

Yet further still, according to some embodiments there is provided a method of evacuating a chamber comprising the steps of: connecting the chamber to a vacuum pump system via a gas conduit; operating the vacuum pump system at a first speed to evacuate the chamber to a first pressure; determining that the pressure in the chamber is about to change to a second pressure higher than the first pressure and varying the speed of a booster in the vacuum pump system to a second speed lower than the first speed; and once the pressure at the vacuum pump system's inlet is at the second pressure, increasing the speed of the booster.

In other words, methods are used to operate the vacuum pumping system in such a way that the booster pump's speed is reduced prior to, or as the pump becomes subjected to a high gas load. As a result any deceleration of the pump's rotor or rotors caused by a sudden increase in gas loading is reduced or minimised which in turn has been found to reduce noise generated by the vacuum pump. Once the pump is subjected to the relatively high gas load, the booster pump is accelerated or sped up to its normal operating speed or the rated speed to enable evacuation to occur as normal. It is anticipated that the second pressure can be atmospheric pressure. This is most likely when the vacuum pumping system is operating to evacuate a loadlock acting to allow substrates to enter a process chamber from a room held at atmospheric pressure.

The second speed can be less than half the rated speed, or more preferably the second speed is 20% of the rated speed. Thus, the booster pump's speed is reduced by a significant amount. We have found good results in noise reduction when the booster pump's speed is reduced to a second speed that is at or near to the level that it would decelerate to if the booster pump were subjected to the high gas load.

In addition, the method can further comprise the step of decreasing the speed of the booster pump at the end of the loadlock cycle when the pressure in the chamber or at the pump's inlet is below the first pressure. Thus, once the chamber has been evacuated to the desired level, the pump can be decelerated. This assists with reducing operating costs of the vacuum pump as well as decreasing or minimising the cycle time.

Additionally, the method can include a step of decreasing the speed of the booster pump by either introducing a gas load into the booster pump, or by activating a braking system on the booster rotor, or by using the booster pump motor, or any combination thereof.

The reduction in speed could be triggered by a number of different conditions including: Monitoring the running condition of the pump via the onboard system controller (for instance, monitoring pump or booster power or current to assess the load on the pump and thereby the state of the loadlock chamber; upon receipt of a signal from the processing tool stating that the loadlock cycle is complete; and/or determined by a controller connected to a pressure sensor in the tool which, once a base pressure has been achieved in the loadlock chamber, sends a signal to the pump indicating that the speed may be reduced.

Furthermore, according to some embodiments there is provided a vacuum pumping system arranged to be connected to a chamber for evacuating the chamber to a first vacuum pressure, the vacuum pumping system comprising; a vacuum pump and a booster pump disposed between the vacuum pump and a chamber; a variable speed motor for driving the booster at or below a rated speed; and a booster pump control unit for predicting when the pressure at an inlet of the booster pump is going to be at atmospheric pressure and for varying the speed of the booster pump's rotor, said control unit being configured to reduce the speed of the booster pump rotor before the pressure at the inlet is at atmospheric pressure.

The means provided for varying the speed of the booster pump's rotor can comprise any of a braking means, or a gas ballast introduction means for introducing a gas at relatively high pressure at the booster pump's inlet. The braking means can comprise a motor adapted to actively slow the booster pump's rotors.

The Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described by way of example with reference to the accompanying drawings, of which.

DETAILED DESCRIPTION

The following description is of one embodiment of the present invention and the invention is not limited to the description provided below. For instance, the present invention can be applied to different industrial applications and is not restricted to the semiconductor industry.

When striving to reduce the noise levels generated by the loadlock evacuation system, particularly during rapid evacuation of the loadlock at atmospheric pressure, we have found that the high noise levels are caused by deceleration of the loadlock pump system, and in particular the deceleration of a booster pump in the vacuum pumping system. The deceleration is caused by the rapid increase in gas load on the vacuum pump system caused by the vacuum pump becoming exposed to relatively high pressure gas (typically at or near to atmospheric pressure) when the loadlock is sealed and pump-down begins (start of the loadlock cycle).

Figure 1:
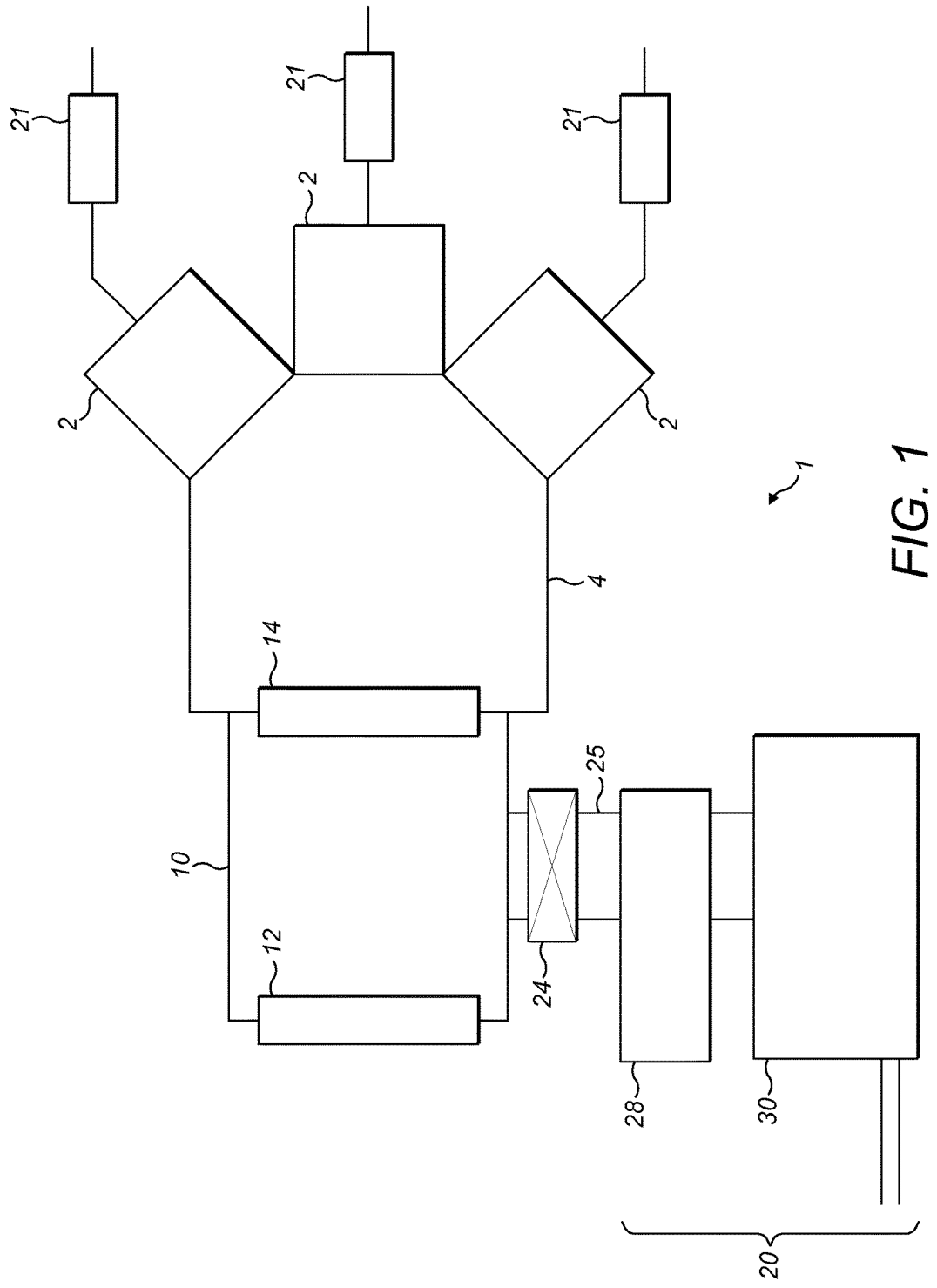
FIG. 1 is a schematic diagram of a known processing tool and evacuation system.
Figure 2:
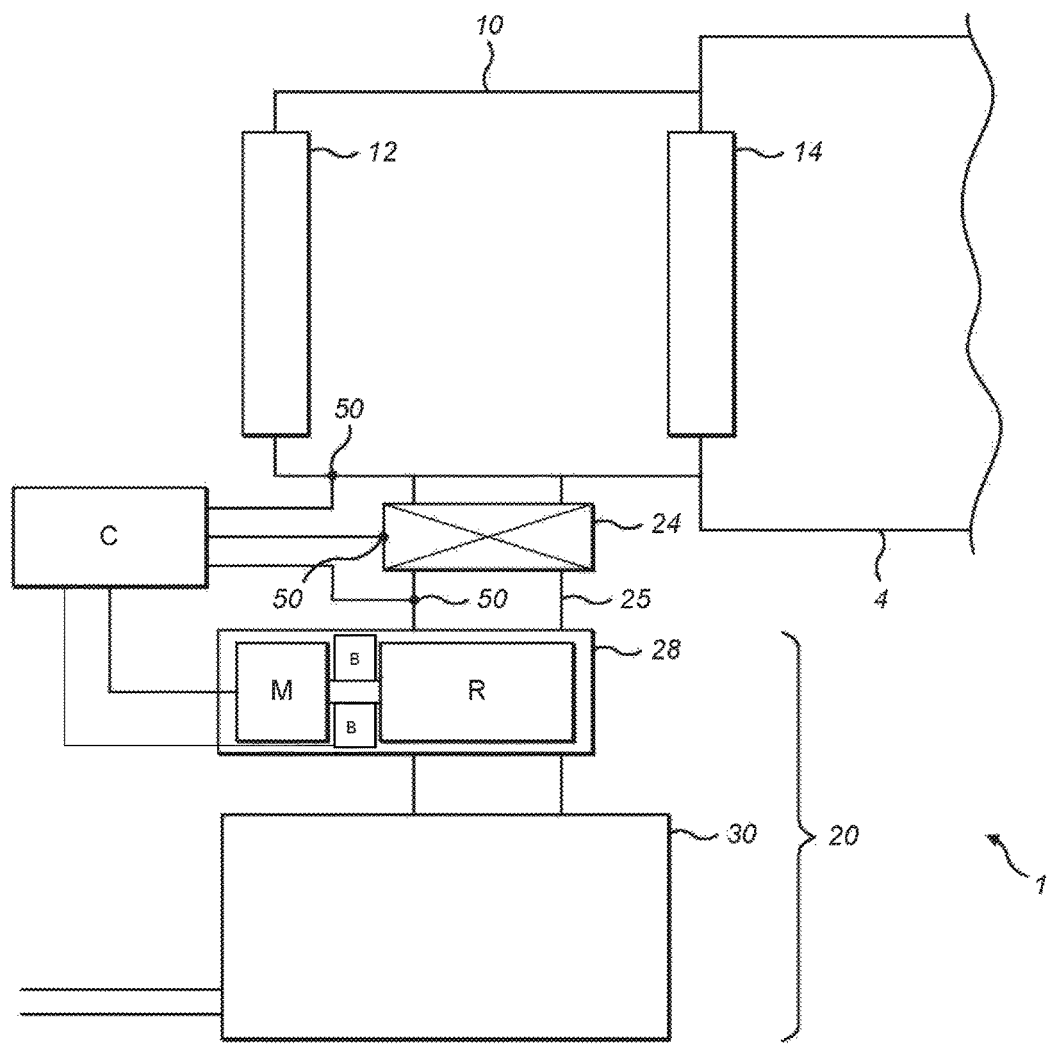
FIG. 2 is a schematic diagram of a processing tool and evacuation system according to the present invention.

With reference to FIG. 2, a vacuum pumping system 20 according to one embodiment of the present invention is shown. The vacuum pumping system is designed to reduce noise generated by the booster pump 28 when the loadlock cycle starts. The system 20 comprises the known components described above and additionally comprises a booster pump controller C. The controller C is connected to a drive motor M of the booster pump. The motor M is adapted to vary the speed of the pump's rotors R. The controller C is also connected to one or more sensors 50 adapted to determine when the pressure in the pumping system inlet pipe 25 is about to increase or is in the process of increasing. The sensor might comprise a pressure sensor in the loadlock chamber 10 or foreline 25 and/or a sensor adapted to determine when the valve 24 is about to open. Thus, information obtained from any one of the sensors (or any combination thereof) can be used by the controller C to control the motor speed of the booster pump 28 and hence the speed of the rotors R.

Additionally, booster pump speed reduction may be triggered by receipt of an appropriate signal from the processing tool or by monitoring the running condition of the vacuum pump to look for a specific event. This might include a low power drawn by the booster motor M during a loadlock cycle indicating that the loadlock chamber is at low pressure (and thus the loadlock cycle is complete) indicating that the booster speed may be reduced in preparation for the next cycle.

A further consideration is that during operation the booster rotors typically have high interia and low gas load towards the end of the loadlock cycle. As a result, the rotors R can take a relatively long time to slow down sufficiently. A production environment typically demands a short cycle time and significant delay caused by excessive loadlock cycle times is unacceptable. As a result there may be a need to adapt the system by providing means to artificially reduce the speed by the booster rotors R. This can be done in a number of ways, for example, by introducing a gas bleed into the inlet of the pump after the loadlock chamber valve has closed. Additionally or as an alternative, the rotor speed can be reduced by using a mechanical brake B or by using the motor M to slow the booster rotors R. The rate of deceleration can then be optimised to deliver minimum cycle time with maximum noise reduction.

In the case of semiconductor manufacturing applications a booster pump typically reduces in operating speed from 100 Hz to between 20 to 40 Hz when the loadlock pump-down sequence starts and the booster pump is suddenly exposed to relatively large volumes of gas at or near to atmospheric pressure. As a result the gas loading on the booster pump increases rapidly. After the initial sudden deceleration, the booster gradually accelerates back to its normal operating speed as the pressure in the loadlock chamber decreases and the gas load on the booster pump reduces. We have found that the rapid deceleration of the booster causes the noise levels to increase from approximately 70 dBA to 97 dBA, whereas the increase in noise levels generated by the increased gas load passing through the vacuum pump of the vacuum pump system is negligible by comparison. Although the exact reason for this increase of the booster noise is not clear at the moment, we have found a solution that reduces the noise generated by the booster when it is exposed to sudden gas loads.

Figure 3:
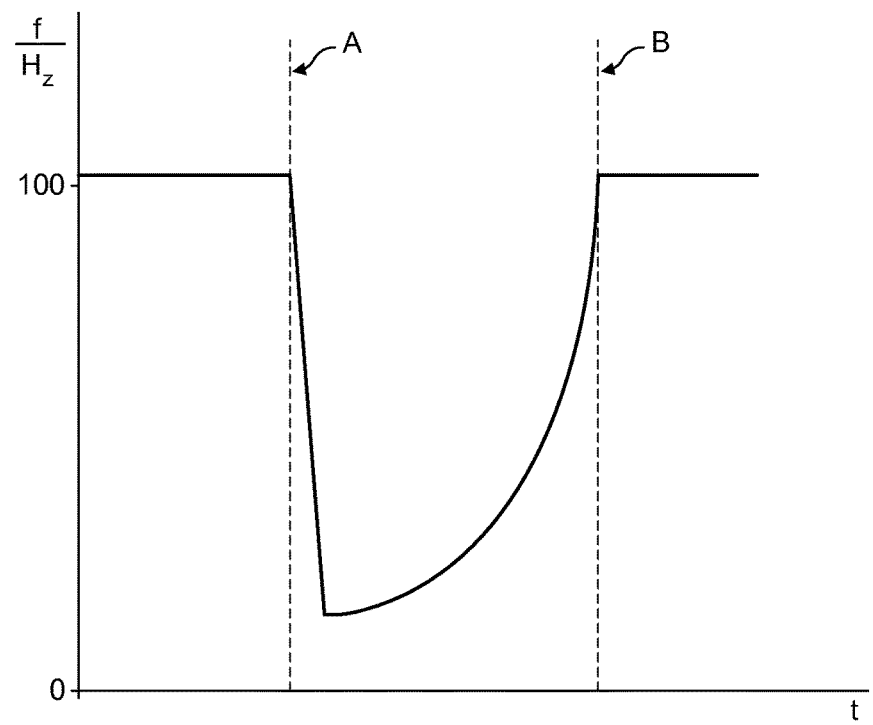
FIG. 3 is a graphical representation of the noise generated by a known vacuum pump system.
Figure 4:
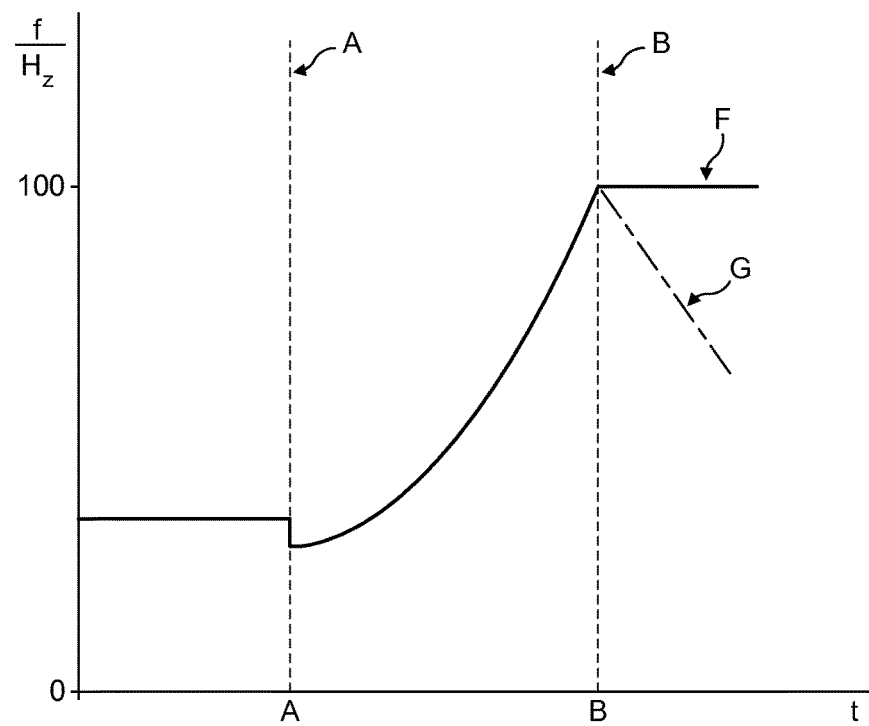
FIG. 4 is a graphical representation of the noise generated by a vacuum pump system according to the present invention.

The graphs shown in FIGS. 3 and 4 show results taken from an experiment conducted on a 1000 liter loadlock evacuated by a GXS750/4200 pump provided by Edwards Limited. As shown in FIG. 3, the pump is operating at 102 Hz when the valve to the loadlock at atmospheric pressure is opened (point A). The rotational speed of the pump rapidly drops under the increased load of the gases evacuated from the loadlock chamber and then slowly increases again as the chamber is evacuated to the desired pressure at point B. An average of the peak noise generated by the pump during this evacuation was measured at 98.5 dBA.

FIG. 4 shows the results taken from a pump operating according to the present invention. The same pump and chamber apparatus used to obtain the plot shown in FIG. 3 are also used to obtain the plot shown in FIG. 4 for consistency. However, by contrast, the booster pump is operating at a reduced rotational rate when the valve 24 insolating the pump from the loadlock chamber 10 is opened and the booster pump 28 is exposed to gases at atmospheric pressure. In this case, it is shown that the pump rotational rate does not significantly decrease as the valve opens. Once the valve is opened, the pump's drive mechanism increases the pump's speed up to the appropriate operational speed needed to evacuate the chamber (in this case, 100 Hz).

It has been found that an average of the peak noise generated by the pump when the pump is operating at 40 Hz and 20 Hz as the loadlock chamber valve is opened is 92.1 dBA and 90.6 dBA, respectively. Thus, it can be seen that the noise generated by the pump is greatly reduced when the pump is operating at a reduced rotational speed as it is exposed rapidly to atmospheric pressure. This is a surprising effect which indicates that the high noise levels are generated as the pump decelerates under large gas loading and that the effect can be mitigated by significantly decelerating the booster pump rotors R prior to the high gas load occurring.

Once the loadlock evacuation procedure has completed and the loadlock chamber is evacuated to the desired pressure, the booster pump can operate at full speed (as indicated by line F). Alternatively, the booster pump speed can be reduced in a controlled manner (as indicated by line G) so that the booster's speed is reduced in time for the next loadlock cycle to commence. In addition, the valve can be closed to isolate the loadlock from the vacuum pumping system to maintain the vacuum pressure in the loadlock chamber.

Pumps in the GXS product range are inverter driven pumps. This makes it is possible to change the speed of the booster pump, therefore the booster pump can be slowed before the valve is opened so that the excessive noise generated by the pump may be reduced or eliminated. At the start of the loadlock cycle (that is, when the loadlock valve isolating the loadlock chamber from the vacuum system is opened) the booster controller C re-accelerates the pump to normal operating speed. The re-acceleration phase is initiated either when the pump's controller receives a signal from the processing tool (or loadlock) or when the booster control system detects any increased load or inlet pressure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of reducing noise generated by a vacuum pumping system operating to evacuate a chamber, the method comprising the steps of:
   operating a booster pump of the vacuum pumping system at a rated speed while a valve between an inlet to the vacuum pumping system and the chamber is open to reduce chamber pressure to a first pressure;
   determining that a pressure in the chamber increased to a second pressure that is higher than the first pressure while the pressure at the inlet of the vacuum pumping system remained at the first pressure due in part to the valve being closed;
   determining that the closed valve is going to open such that the pressure at the inlet of the vacuum pumping system is going to change to the second pressure;
   in response to determining that the pressure at the inlet of the vacuum pumping system is going to change to the second pressure, reducing the speed of the booster pump to a second speed that is below the rated speed; and then
   increasing the speed of the booster pump to the rated speed when the pressure at the inlet of the vacuum pumping system increases from the first pressure when the valve is opened.

2. The method according to claim 1, wherein the second pressure is atmospheric pressure.

3. The method according to claim 1, wherein the second speed is less than half the rated speed.

4. The method according to claim 3, wherein the second speed is 20% of the rated speed.

5. The method according to claim 1, further comprising the step of decreasing the speed of the booster pump when the pressure in the chamber or at the inlet of the vacuum pumping system is below the first pressure.

6. The method according to claim 1, further comprising the step of decreasing the speed of the booster pump by either introducing a gas load into the booster pump, or by activating a brake on a booster rotor of the booster pump, or by using a motor of the booster pump, or any combination thereof.

* * * * *